United States Patent [19]

Nihei et al.

[11] Patent Number: 4,781,354
[45] Date of Patent: Nov. 1, 1988

[54] SEAT SLIDE DEVICE FOR CAR

[75] Inventors: Masao Nihei, Yokohama; Fugio Takahashi, Ayase, both of Japan

[73] Assignee: Ohi Seisakusho Co., Ltd., Ayase, Japan

[21] Appl. No.: 76,337

[22] Filed: Jul. 22, 1987

[30] Foreign Application Priority Data

Jul. 23, 1986 [JP] Japan .................. 61-171853

[51] Int. Cl.$^4$ .................................. F16M 13/00
[52] U.S. Cl. ................... 248/429; 248/424; 248/430; 297/379
[58] Field of Search ............... 248/429, 430, 424, 417, 248/419, 420, 423, 393; 297/379, 378; 296/65 R

[56] References Cited

U.S. PATENT DOCUMENTS

| | | | |
|---|---|---|---|
| 4,209,159 | 6/1980 | Becker et al. | 248/430 |
| 4,378,101 | 3/1983 | Kazaoka et al. | 248/429 |
| 4,394,048 | 7/1983 | Sakurai et al. | 297/379 X |
| 4,607,884 | 8/1986 | Heling | 248/429 X |
| 4,621,867 | 11/1986 | Perring et al. | 248/429 X |
| 4,635,890 | 1/1987 | Matsuda et al. | 248/429 |
| 4,671,571 | 6/1987 | Gionet | 248/429 X |
| 4,707,030 | 11/1987 | Harding | 248/430 X |

Primary Examiner—Ramon O. Ramirez
Attorney, Agent, or Firm—Zarley McKee, Thomte, Voorhees & Sease

[57] ABSTRACT

A seat slide device for a car having a slidable seat having a forwardly tiltable back support, wherein a lock member is mounted on an operating shaft parallel to a movable rail pivoted to said movable rail, the lock member having pawls capable of being selectively engaged and disengaged with respect to any of the engagement holes. The pawls are always biased in the direction in engaging the engagement holes, and a retaining member linked to the back support is pivoted to an operating member such that when the back support of the seat is forwardly tilted, it engages with a part of the lock member to cause rotation to the pawls in the direction of causing disengagement of the pawls from the engagement holes, and the retaining member is provided with an engagement section capable of being brought into contact with the rear end of a restricting section, when the back support is turned to be upright and being displaced side wise of the restricting section to prevent restoration.

10 Claims, 2 Drawing Sheets

4,781,354

SEAT SLIDE DEVICE FOR CAR

FIELD OF THE INDUSTRIAL UTILIZATION

This invention relates to a seat slide device for a two-door car having a walk-in function, wherein when the back support of said seat is forwardly tilted when getting in to or getting out of a rear seat. A lock holds the front seat locked at a desired position in the forward and rearward directions and is unlocked to cause advancement of the entire front seat when back support of said front seat is moved upright and pulled rearwardly after the end of the getting in to or getting out of said rear seat, the entire front seat is moved rearwardly, and when the front seat reaches a predetermined standard position, the lock is automatically locked to hold the front seat at that position.

PRIOR ART

As a prior art seat slide device of the type noted above, there are those disclosed in Japanese Patent Publication No. 54-574 or Japanese Utility Model Publication No. 57-28671.

In those prior art devices, when pawls of the lock member for holding the front seat at a desired position in the forward and rearward direction are broken, the front seat is moved up to the most advanced position until it is engaged with a suitable stopper.

In the above prior art device, if the front leg space of the front seat in the most advanced position is too narrow, the knees of the person seated is liable to strike the front wall of the car room and be injured in the case of an accident. Therefore, it is impossible to substantially increase the distance between the front end of the front seat at the most advanced position and the front wall. Conversely, if the distance is increased, the front seat becomes obstructive when getting in to and of the rear seat, so that the passenger can not easily get in to or get out of the seat.

An object of the invention is to provide a seat slide device for a car, which can solve the above problems by maintaining the safety, permitting easier getting in to and getting out of the rear seat and improving the mechanical strength with respect to shocks in the case of an accident.

SUMMARY OF THE INVENTION

According to the invention, there is provided a seat slide device for a car, in which a seat section of a seat having a forwardly tiltable back support is secured to a movable rail slidably provided along a stationary rail secured to the car body. The stationary rail or a lock plate secured thereto is provided with a plurality of engagement holes arranged in the longitudinal direction of the stationary rail. The front section of the lock plate is provided with a restraining section having a suitable length projecting sidewise. A lock member is mounted on an operating shaft pivotally mounted along a movable rail. The lock member has pawls capable of being selectively engaged and disengaged with respect to some of the engagement holes. The pawls are biased at all times in the direction of engagement in the engagement holes. A retaining member linked to the back support is pivoted to the operation member ahead of the lock member such that when the back support of the seat is forwardly tilted, it engages with part of the lock member and causes rotation of the pawls in the direction causing disengagement of the pawls from the engagement holes. The retaining member is provided with an engagement section capable of being brought into contact with the rear end of the restricting section when the back support of the seat is moved upright and being displaced sidewise of the restricting section by the side edge of the restraining section to prevent restoration.

With the seat slide device for a car according to the invention, when the person front seated in the seat controls the position of the seat in the forward and rearward directions according to the height, the operation shaft is rotated in a desired direction to cause disengagement of the pawls of the lock member integral with the operating shaft from the engagement holes, and in this state the front seat is moved forwards or backwards.

Since the back support of the seat is upright, the engagement section of the retaining member is at a position capable of engagement with the rear end of the restraining section. When the seat is advanced up to a predetermined standard position, the engagement section is brought into contact with the rear end of the restraining section, and further advancement of the seat is prevented with the retaining member held sandwiched between the rear end of the restraining section and front end of the lock member.

Therefore, after the adjustment of the position of the seat in the forward and rearward directions in the seated state, the seat can not be advanced beyond the standard position.

When the hand is separated from the operating shaft after the seat has been stopped at a desired position, the pawls of the lock member are engaged in corresponding engagement holes, thereby locking the seat at that position.

When getting in to or getting out of the back seat, the back portion of the front seat is forwardly tilted, and the entire front seat is advanced.

With the tilting of the back support at this time, the engaging section of the retaining member is displaced to one side of the restraining section. At the time of the subsequent advancement of the seat, the engagement section of the retaining member will not engage the rear end of the restraining section, and the seat can be moved forwardly beyond the standard position.

At the time of a collision of the car, if the pawls of the lock member are broken, the seat is moved forwardly by its momentum. In this case, like the case of the position adjustment of the seat in the forward and rearward directions in the above seated state, the restraining section of the retaining member is brought into contact with the rear end of the restraining section, and the advancement of the seat from the standard position is reliably prevented with the retaining member sandwiched between the rear end of the restraining section and front edge of the lock member.

DETAILED DESCRIPTION OF THE PREFERRED EMBODIMENT

Figure 1:
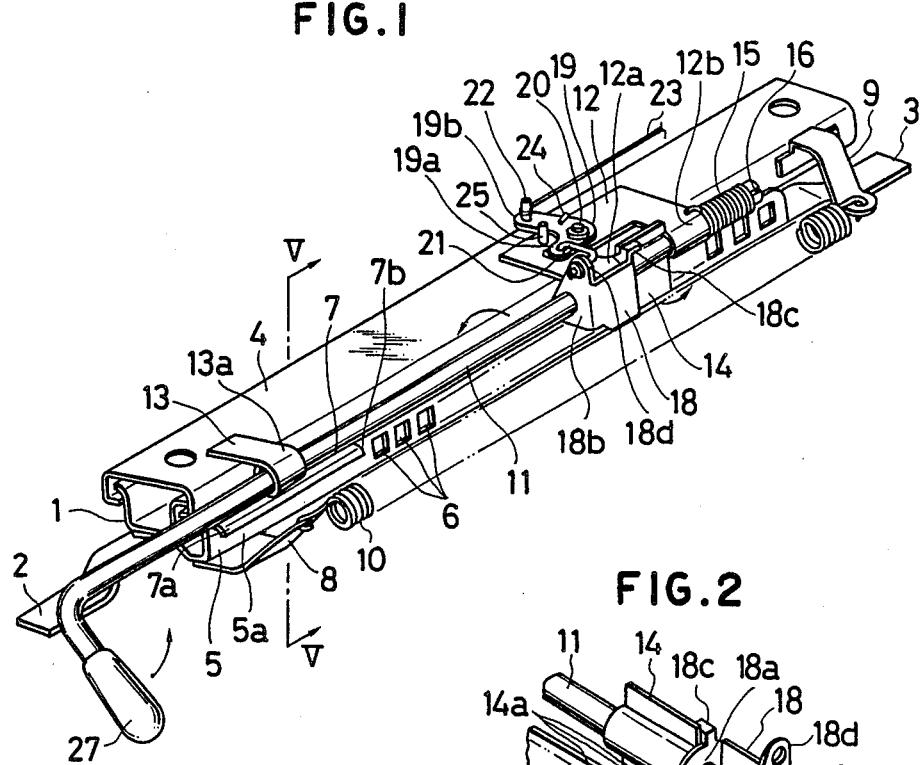
FIG. 1 is a perspective view showing an embodiment of the invention looking from the front.

Now, an embodiment of the invention will be described with reference to the accompanying drawings.

Reference numeral 1 designates a stationary rail, which is secured on a floor (not shown) of a car body by suitable securing members 2 and 3 and extends in the forward and backward direction. Reference numeral 4 designates a movable rail, which is mounted on the stationary rail 1 on suitable rollers (not shown) and extends in the forward and rearward direction. The stationary and movable rails 1 and 4 constitute a rail pair which is provided on each side of the floor of the car. The opposite side movable rails 4 are secured to opposite sides of the lower surface of a seat portion (not shown) of a well-known front seat having a forwardly tiltable back support.

Opposite side mechanisms below the seat portion are mostly transversally symmetrical. Therefore, in the following description only the left side construction will be described, and the right side construction will not be described.

A lock plate 5 is secured to the lower surface of the stationary rail 1. The lock plate 5 extends from the lower portion of the stationary rail 1 toward the inner space between the opposite side rails 1 and then extends upwardly.

The upwardly extending portion 5a of the lock plate 5 is provided with a plurality of rectangular engagement holes 6 arranged at a constant interval in a row extending in the longitudinal direction of the stationary rail 1.

It is possible to form engagement holes 6 in the stationary rail 1 itself or in a different member secured thereto.

The upper edge of the upwardly extending portion 5a at the front of the lock plate 5 is provided with a restraining section 7 having a predetermined length, which extends inwardly and horizontally and has an inwardly downwardly inclined edge portion 7a. The trailing end of the restraining section 7 constitutes a stopper 7b for stopping the seat at a standard position.

A coil-like return spring 10 is stretched between the free end of a bracket 8, which is secured to the lower surface of a front portion of the lock plate 5 and extends inwardly upwardly into the space between the two stationary rails 1, and the free end of a bracket 9, which is secured to the side surface of a rear end portion of the movable rail 4 and extends inwardly downwardly. The movable rail 4 and the seat integral therewith is spring biased at all time with respect to the stationary rail 1 by the return spring 10.

On the side of the movable rail 4, an operating shaft 11, which is located above the upwardly extending portion 5a of the lock plate 5 and parallel to the movable rail 4, is mounted rotatably by a pair of, i.e., front and rear, cylindrical portions 12a and 12b formed on the edge of a rear bracket 12 secured to the top of the movable rail 4 and a cylindrical portion 13a of a bracket 13 secured to the top of the front portion of the movable rail 4.

To the portion of the operating shaft 11 between the two cylindrical portions 12a and 12b of the bracket 12 is secured a lock member 14, which is provided at the lower end with a suitable number of pawls 14a capable of being selectively engaged and disengaged with respect to some of the engagement holes 6 of the lock plate 5.

Reference numeral 15 designates a spring, which is wound on a rear end portion of the operating shaft 11 and has one end secured to the rear end of a bracket 12 and the other end on a slit 16 formed at the rear end of the operating shaft 11. The spring 15 biases a lock member 14 through the operating shaft 11 in a direction of causing engagement of the pawls 14a in the engagement holes 6.

In this embodiment, the spring 15 is provided between the operating shaft 11 and movable rail 4. However, it is possible to provide a spring between the lock member 14 and movable rail 4 for biasing the lock member 14.

By causing rotation of the operating shaft 11 in the direction of arrow shown in FIG. 1 against the biasing force of the spring 15, it is possible to cause detachment of the pawls 14a of the lock member 14 from the engagement holes 6 and move the front seat forwards or backwards to a desired position.

Around a portion of the operating shaft 11 between the front cylindrical portion 12a of the bracket 12 and lock member 14 and around a portion of the operating shaft 11 ahead of the cylindrical portion 12a, rear and front pieces 18a and 18b of a retaining member 18 having a channel-shaped plan shape surrounding the cylindrical portion 12a of the bracket 12 are mounted rotatably on the operating shaft 11.

The upper end of the rear piece 18a of the retaining member 18 is provided with an engagement piece 18c extending rearwardly and capable of being engaged with the inner surface of the upper end of the lock member 14, and the upper end of the front piece 18b in the retaining member 18 is provided with an upwardly directed arm portion 18d.

On the bracket 12 a central portion of a crank lever 19 with a forwardly directed arm portion 19a and an outwardly directed arm portion 19b is pivoted by an upwardly directed pin 20. The free end of the forwardly directed arm portion 19a and free end of the arm portion 18d of the retaining member 18 are connected together by a connecting rod 21.

The front end of a rearwardly directed wire 23 is secured to a pin 22 extending from the top of a front end portion of the arm portion 19b of the crank lever 19. The rear end of the wire 23 is secured to for instance, to the free end of an arm portion (not shown) of a back support extending rearwardly from a hinged center of the back support of the front seat.

When the back support is tilted, the wire 23 is rearwardly pulled, and the pulling force is transmitted to the retaining member 18 through the crank lever 19 and connecting rod 21, causing engagement of the engagement piece 18c of the retaining member 18 with the inner surface of the upper end portion of the lock member 14 to cause rotation of the pawls 14a of the lock member 14 such that these pawls 14a are detached from the engagement holes 6.

Reference numeral 24 designates a spiral spring, which is wound on a pin 20 extending between the upper surface of the bracket 12 and crank lever 19 and has one end secured to the arm portion 19b of the crank lever 19 and the other end engaged with the bracket 12. The spiral spring 24 biases the crank lever 19 in the counterclockwise direction when viewed from above in FIG. 1 and also biases the retaining member 18 through a connecting rod 21 in a clockwise direction in FIG. 5.

When the arm portion 19b of the crank lever 19 is brought into contact with a stopper 25 projecting from the bracket 12, an engagement portion 26 formed by the lower end of the rear piece 18a of the retaining member 18 is usually held at a suitable position, at which it can be engaged with the rear end of the retaining section 7.

When the back support is tilted from this state as in the above, the restraining member 18 is located at a release position, at which the engagement portion 26 is detached further inwardly of the edge 7a of the restraining section 7. At this time, the pawls 14a of the lock member 14 are detached from the engagement holes 6 with the upper end of the lock member 14 pushed by the engagement piece 18c in the counterclockwise direction shown in FIG. 6.

Figure 7:
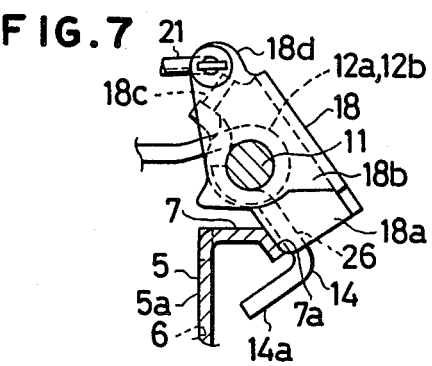
FIG. 7 is a view showing the engagement section of the retaining member brought into contact with the side edge of the restraining section.

Further, with the retaining member 18 held in the released state the movable rail 4 and seat are advanced until the engagement section 26 is located at a suitable mid-way position between the front and rear ends of the retaining section 7. When the back support of the seat is returned to be upright, the engagement member 8 is brought into contact with the edge 7a of the restraining portion 7, as shown in FIG. 7, thus preventing the retaining member 18 from being returned to the stop position. Also, the lock member 14 is held by the engagement piece 14a in a state detached from the engagement holes 6.

The front end of the operating shaft 11 is provided with a handle 27 which is operable by a person seated in the seat.

In the right side mechanism (not shown) under the seat, no handle is provided. Instead, the operating shaft (not shown) in the right side mechanism and operating shaft 11 in the left side mechanism note above are interlocked to each another in a synchronized fashion so that the opposite side mechanisms are operated at the same time and likewise.

Now, the functions and operation procedures of the embodiment will be described.

Figure 5:
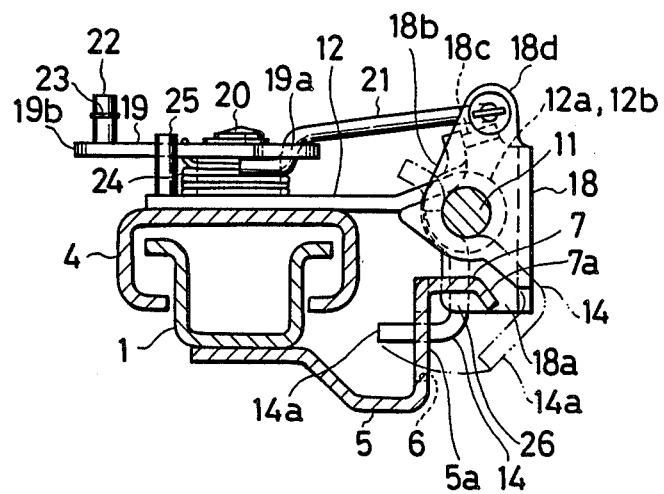
FIG. 5 is an enlarged-scale view taken along line V—V in FIG. 1 showing the retaining member in a stop position.

When the back support of the front seat is in an upright state, the pawls 14a of the lock member 14, as shown in FIGS. 1 and 5 (solid states), are engaged in some of the engagement holes 6, with the front seat locked at a suitable position in the forward and rearward directions and the retaining member 18 held in the stop position.

When the person seated in the seat rotates the operating shaft 11 in the direction of arrow in FIG. 1 against the biasing force of the spring 15 from this state, only the operating shaft 11 and lock member 14 are rotated in the counterlockwise direction as shown in the Figure with the retaining member 18 held in the stopped position as shown in FIG. 5, and the pawls 14a of the lock member 14 are detached from the engagement holes 6 as shown in imaginary lines.

When the handle 27 is released from the hand after the front seat has been moved to a desired position in the forward and rearward directions in this state, the lock member 14 is rotated in the clockwise direction in FIG. 5 together with the operating shaft 11, whereby the pawls 14a of the lock member 14 are engaged with the engagement holes 6 other than the case noted above to lock the front seat in a desired position.

Figure 2:
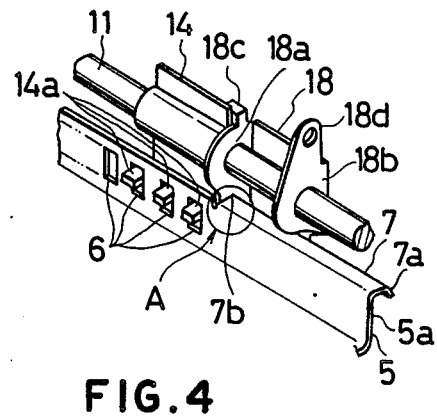
FIG. 2 is a perspective view showing a part of the seat slide when the seat has reached a standard position.
Figure 3:
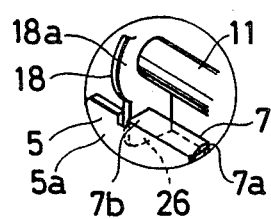
FIG. 3 is an enlarged scale view showing a section A shown in FIG. 2.

At the time of the adjustment of the position of the seat in the forward and rearward directions by the person seated in the front seat, when the seat is advanced to a predetermined standard position, the engagement section 26 of the retaining member 18 is brought into contact with the stopper 7b of the rear end of the restraining section 7 as shown in FIGS. 2 and 3, whereby further advancement of the seat is prevented with the engagement section 26 sandwiched between the stopper 7b and lock member 14. As a result, the leg space of the seated person cannot be, accordingly, the knees of the seated person or the like never strike the front wall (not shown) of the car. Thus, the person who is sitting in the front seat is protected so as not to be injured.

Figure 6:
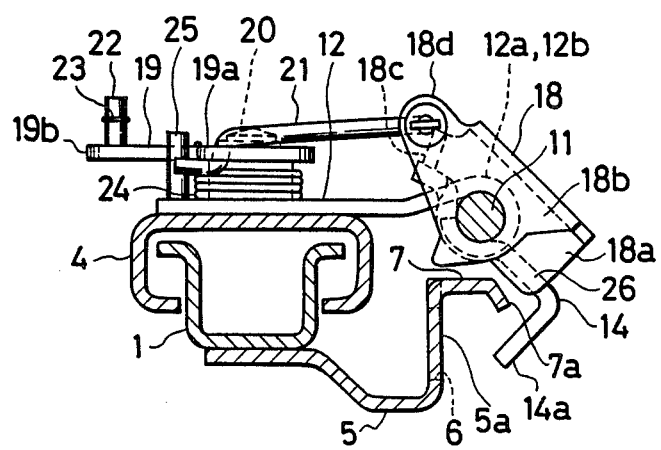
FIG. 6 is a view similar to FIG. 5 showing the back support of the seat tilted forwardly from the state shown in FIG. 5.

When the back support of the front seat is forwardly tilted seating in the rear seat, the wire 23 is pulled, and the retaining member 18 is rotated in the counterclockwise direction up to a release position, as shown in FIG. 6.

As a result, the lock member 14 and operating shaft 11 are rotated in the same direction by the engagement piece 18c of the retaining member 18, the pawls 14a of the lock member 14 are detached from the engagement holes 6.

At the same time, the front seat is advanced up to the most advanced position by the biasing force of the return spring 10, and the movable rail 4 or seat portion of the seat is brought into contact with a stationary rail 1 or a suitable stopper (not shown) provided on the car body. Thus, the front seat is held stopped at that position.

At the time, the retaining member 18 is held at a released position, and the engagement section 26 has been changed inwardly from the restraining section 7. Thus, the engagement section 26 does not engage the restraining section 7, and the seat can freely pass through the standard position and is advanced up to the most advanced position.

In this state, the passenger can be seated on the seat or get out of the car.

In this case, the front seat is located at the most advanced position forwardly of the standard position, and the back support is in a forwardly tilted state. Thus, the passenger can easily sit in to and get out of the back seat. Further, since there is no passenger on the front seat, it is possible to set the most advanced position of the front seat to any desired position without any trouble.

When the back support of the front seat is returned to be upright after completion of the seating or getting-out-of the rear seat, the wire 23 is loosed and, the retaining member 18 tends to be returned to a stop position by the biasing force of the spiral spring 24.

Figure 4:
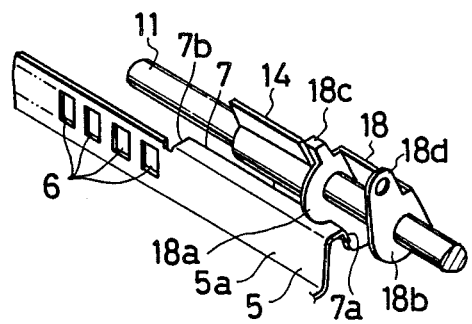
FIG. 4 is a perspective view showing the engagement section of the retaining member brought into contact with the side edge of the restraining section.

At this time, the engagement section 26 is brought into contact with the edge 7a of the restraining section 7, as shown in FIGS. 4 and 7. Thus, restoration of the retaining member 18 in the direction of stop position, and the lock member 14 is held in a state with the pawls 14a detached from the engagement holes 6.

When the back support is pulled rearwardly in this state to allow retreat of the entire front seat, the engagement section 26 is moved along the edge 7a of the restraining section 7.

When the front seat reaches the standard position, the engagement section 26 gets out of the rear end of the side edge 7a of the restraining section 7. The restraining member 18 is returned to the stop position by the biasing force of the spring 24. Further, the lock member 14 is rotated in the clockwise direction shown in FIG. 7 by the biasing force of the spring 15, whereby the pawls 14a are engaged with the engagement holes 6 of the foremost section (FIG. 2), and the front seat is locked at the standard position.

In the event when the pawls 14a of the lock member 14 are broken at the time of a collision of the car, the seat is moved forwardly due to the moment of inertia. In this case, like the case of the position adjustment of the seat in the forward and rearward directions with the passenger in the seated state as noted above, the engagement section 26 of the engagement member 18 is brought into contact with the stopper at the rear end of the restraining member 7, whereby advancement of the seat forwardly of the standard position with the retaining member 18 held sandwiched between the stopper 7b and front edge of the lock member 14 is reliably prevented.

However, even at the time of such an accident, the knees of the person seated in the front seat never strike the front wall of the car thereby preventing injury.

As is apparent from the foregoing, according to the invention the following effects can be obtained.

(a) When the person seated in the seat makes position adjustment of the seat in the forward and rearward directions, the seat is not moved forwardly from the standard position, so that there is no possibility that the knees of the seated person strike the front wall of the car to result in an injury, and safety can be ensured.

(b) In the event if the pawls of the lock member are broken at the time of the collision of the car, the engagement section of the retaining member strikes the rear end of the restraining section, whereby the movement of the seat from the standard position is prevented, and high safety of the seated person can be ensured.

(c) When getting in to or getting out of the rear seat, the back support of the front seat is tilted, and by so doing the front seat can be moved further forwardly beyond the standard position. Thus, the passenger can easily be seated in and get out of the back seat.

(d) Owing to the effects (a) through (c) it is possible to mount the seat even in a car where the door opening section or inner space of the car is narrow. It is thus possible to increase the freedom of the car interior layout.

What is claimed is:

1. A seat slide device for a car having a car seat with a seat section and a forwardly tiltable back support, comprising:
   a stationary rail means secured to the car body and having forward and rearward ends;
   a movable rail slidably mounted on said stationary rail means and being slidable so that said seat is movable between a rearward position and a forward position, and a standard position being set between said rearward and forward positions;
   said stationary rail means having a plurality of engagement holes arranged longitudinally along the rail means;
   a restraining section on the forward end of said stationary rail means and having a rearward end with a stopper thereon;
   an operating shaft pivotally mounted on said movable rail;
   a lock member pivotally mounted on said operating shaft and having at least one pawl adapted for selected engagement and disengagement with said engagement holes;
   means for normally biasing said pawl into engagement with one of said engagement holes; and
   a retaining member pivotally mounted on said operating shaft forwardly of said lock member and operatively connected to said back support, such that when said back support is titlted forwardly, said retaining member engages said lock member and pivots said lock member to disengage said pawl from said engagement hole, whereby said seat is movable to said forward position, and when said back support is returned to a normal upright position, said seat is movable to said standard position, and said retaining member contacts said stopper and is held between said stopper and said lock member whereby forward movement of the seat from the standard position to the forward position is prevented.

2. A seat slide device as defined in claim 1, wherein said restraining section (7) extends inwardly and horizontally and has an inwardly downwardly inclined edge portion (7a).

3. A seat slide device as defined in claim 2, wherein the trailing edge of said restraining section (7) constitutes a stopper (7a) for stopping the seat at a standard position.

4. A seat slide device as defined in claim 1, wherein said retaining member (18) has a channel-shaped plan shape surrounding a cylindrical portion (12a) of a bracket (12).

5. A seat slide device as defined in claim 1, wherein rear and front pieces (18a) and (18b) of said retaining member (18) are rotatably mounted on the operating shaft (11).

6. A seat slide device as claimed in claim 5, wherein the upper end of the rear piece (18a) of said retaining member (18) is provided with an engagement piece (18c) extending rearwardly and capable of being engaged with the inner surface of the upper end of said lock member (14).

7. A seat slide device as defined in claim 5, wherein the upper end of the front piece (18b) of the retaining member (18) is provided with an upwardly directed arm portion (18d).

8. A seat slide device as defined in claim 7, wherein a free end of a forwardly directed arm portion (19b) of a crank lever (19) being pivoted on a bracket (12) and a free end of the arm portion (18d) of said retaining member (18) are connected together by a connecting rod (21).

9. A seat slide device for a car having a car seat with a seat section and a forwardly tiltable back support, comprising:
   a stationary rail means secured to the car body and having forward and rearward ends;
   a movable rail slidably mounted on said stationary rail means and being slidable so that said seat is movable between a rearward position and a forward position, and a standard position being set between said rearward and forward positions;
   stop means on said stationary rail means between said forward and rearward ends, said stop means defining said standard position and limiting the forward movement of said seat to said standard positions;

lock means for selectively locking said seat in a desired position between said rearward position and said standard position; and retaining means operatively connected to said back support such that upon forward tilting of said back support, said seat is free to move beyond said standard position and to said forward position.

10. The device of claim 9 wherein said retaining means is engagable with said stopper when said back support is in an upright position so as to prevent said seat from moving forwardly beyond said standard position, and said retaining means pivoting beyond engagement with said stopper when said back support is tilted forwardly so as to permit said seat to move forwardly beyond said standard position to said forward position.

* * * * *